(No Model.)
A. B. DENTON.
FILTER.
No. 296,939. Patented Apr. 15, 1884.
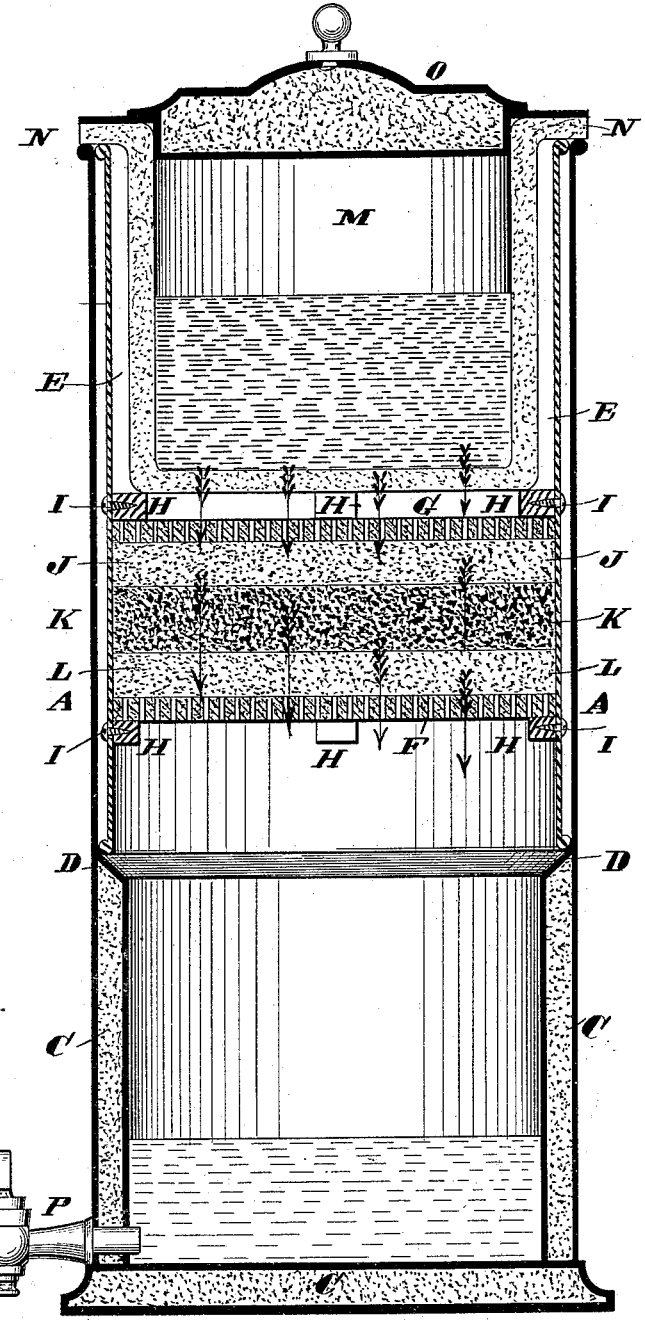
Attest:
Charles Pickles
Edw. E. Israel.
Inventor:
Ansel B. Denton
By Knight Bro.
Atty's

UNITED STATES PATENT OFFICE.

ANSEL B. DENTON, OF ST. LOUIS, MISSOURI.

FILTER.

SPECIFICATION forming part of Letters Patent No. 296,939, dated April 15, 1884.

Application filed July 28, 1883. (No model.)

*To all whom it may concern:*

Be it known that I, ANSEL B. DENTON, of the city of St. Louis, in the State of Missouri, have invented certain new and useful Improvements in Filters, of which the following is a full, clear, and exact description, reference being had to the accompanying drawing, forming part of this specification.

Reference is made to the claims for statement of invention.

The drawing is an axial section of the filter.

A is an outer case that may be of any preferred form. It may be supposed to be cylindrical, being open at the top and closed at the bottom. The bottom B and the sides to a certain height are packed with charcoal or other non-conducting substance, C, filling the close chambers of the bottom and sides, as shown. The top of the annular side chamber forms a shoulder, D, upon which rests an inner cylindrical case, E, open at both top and bottom.

F and G are finely-perforated plates fitting the interior of the case E, and held in position by removable rests or cleats H, held in place by screws I, which pass through the side of the case E and screw into the cleats; or other suitable means may be used to hold the cleats in place. The perforated plates may be made of any suitable material. They are fixed a proper distance asunder by filtering material J K L, that may consist of a single substance, but which I prefer to form of two or more layers of different substances, the coarser being on top. One or more of the lower layers may be of some antiseptic material—such as vegetable or animal charcoal—to correct any organic impurity, while other of the layers may be of gravel, sand, or other material that will serve mechanically to detain the inorganic and the larger impurities of the water, and thus preserve the other layers in an effective condition by keeping them clear of grosser matters. The layers J K L may consist of gravel, charcoal, and sand, or of any other suitable material.

It will be understood that the case E may be readily removed, and, being inverted, clear water may be poured through it to wash out all impurities by a current in the opposite direction to that of the water in filtering. When the case E is taken out, the filling matter of the filter can be readily removed by taking out either set of the rests or lugs H and allowing the plate F or G to drop out.

M is a vessel, composed in whole or in part of porous earthenware, into which the water is first poured. The water percolates through the bottom and sides of this vessel and drips upon the filter beneath. The vessel is shown with an outturned rim, N, that rests upon the upper edge of the outer case, A. In place of making the vessel M solely of porous earthenware, its bottom alone may be made of this material, and the sides may be made of metal or any other suitable material.

O is the cover of the filter.

P is a faucet to draw out the clear water.

It will be seen that the vessel M acts as a mechanical filter, and the filtering material below may act both mechanically and chemically.

I claim as my invention—

1. The combination, with an outer case and porous vessel removable therefrom, of an inner case intermediate of the porous vessel and outer case, provided with perforated plates having filtering material between them, as set forth.

2. The combination of outer case, A, having shoulder D, inner case, E, supported on the shoulder, perforated plates fitting the interior of the inner case, having filtering material between them, and porous vessel M, supported on the cases by a suitable rim, and removable therefrom without removing the inner case, as set forth.

3. The combination, in a filter, of the outer case, A, and a removable case, E, with removable perforate plates F G, and removable rests or cleats H, for the purpose set forth.

ANSEL B. DENTON.

Witnesses:
  SAML. KNIGHT,
  EDW. E. ISRAEL.